Oct. 6, 1964  L. B. CROUCH ETAL  3,151,600
BIRD FEEDER
Filed Nov. 7, 1962  2 Sheets-Sheet 2
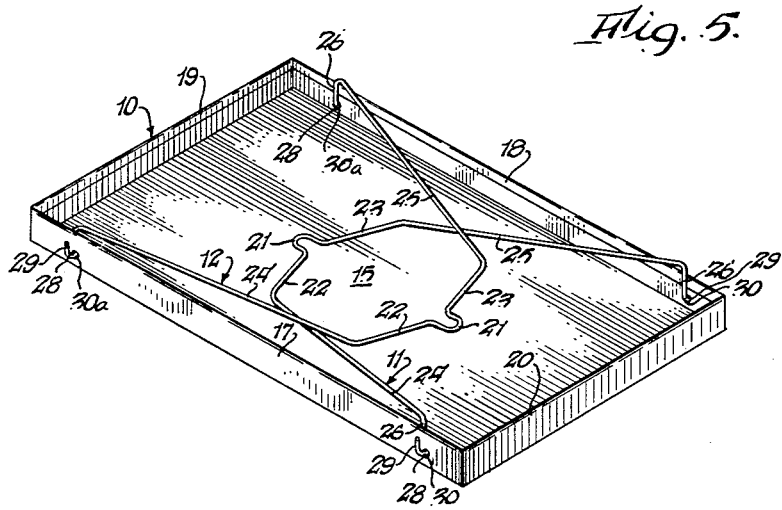
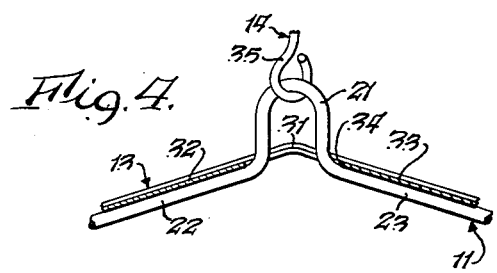
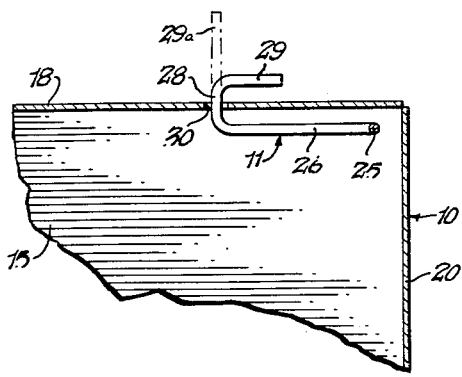
INVENTORS
LINDSLEY B. CROUCH
ARTHUR B. TAYLOR
BY Popp and Sommer
ATTORNEYS United States Patent Office 3,151,600
Patented Oct. 6, 1964

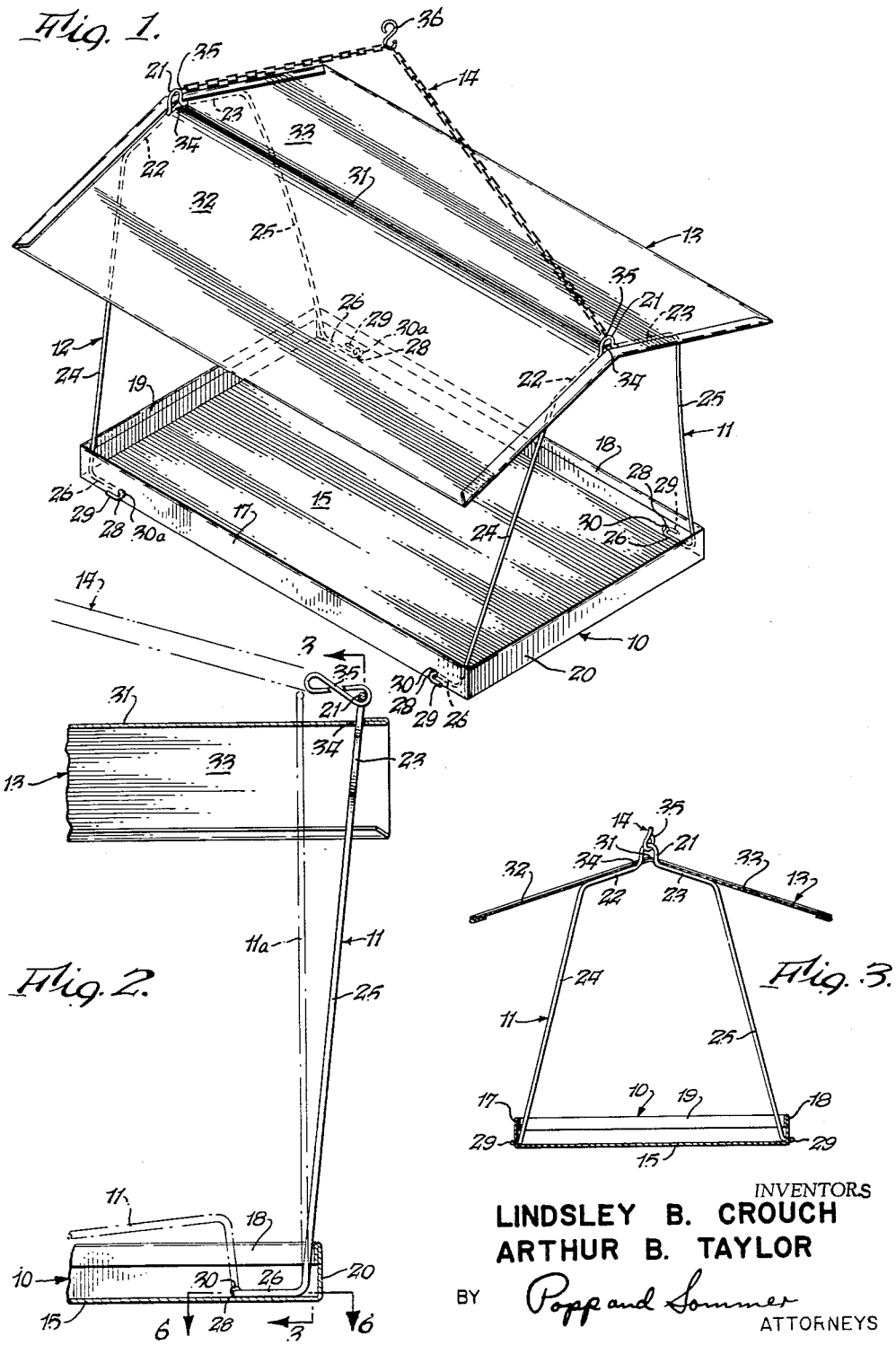

3,151,600
BIRD FEEDER
Lindsley B. Crouch, Fillmore, and Arthur B. Taylor, Houghton, N.Y., assignors to Cuba Specialty Manufacturing Co., Inc., Houghton, N.Y., a corporation of New York
Filed Nov. 7, 1962, Ser. No. 236,082
4 Claims. (Cl. 119—51)

This invention relates to improvements in bird feeders.

An object of the present invention is to provide a knock-down bird feeder which can be packaged in compact arrangement for shipment and which is easy to assemble, without the use of any tools, into a structure in which a roof member is supported in an elevated position over a tray member adapted to contain bird food.

Another object is to provide such a bird feeder which is simple in construction, being preferably composed of components made of stock material such as sheet metal and metal wire which can readily be cut and bent into the desired shape, thus being easy to fabricate and inexpensive to manufacture.

Still another object is to provide such a bird feeder which is relatively sturdy in construction although of light weight and attractive in appearance.

Other objects and advantages of the invention will be apparent from the following detailed description of a preferred embodiment which is illustrated in the accompanying drawings.

FIG. 1 is a perspective view of a bird feeder constructed in accordance with the principles of the present invention and shown in its assembled operative condition.

FIG. 2 is an enlarged fragmentary vertical longitudinal central sectional view of the right end portion of the bird feeder as shown in FIG. 1.

FIG. 3 is a vertical transverse view thereof, on a reduced scale, and taken on line 3—3 of FIG. 2.

FIG. 4 is an enlarged fragmentary transverse sectional view of the upper central portion of the bird feeder at the right end thereof as shown in FIG. 3.

FIG. 5 is a perspective view of the tray member and roof support members of the bird feeder, and showing the support members in their folded inoperative positions.

FIG. 6 is an enlarged fragmentary horizontal sectional view of one corner of the tray member and showing the manner of pivotal connection of a roof support member thereto, this view being taken on lines 6—6 of FIG. 2.

The inventive bird feeder comprises a tray member 10, a pair of support members 11 and 12, a roof member 13 and a suspension device 14.

While the tray member 10 may be constructed of any suitable material and may be formed into the shape desired, the same is shown as fabricated of a single piece of sheet metal bent to provide a floor portion 15 of elongated rectangular outline in plan and formed with upstanding side walls 17 and 18 and transverse end walls 19 and 20. The upper marginal portions of the upstanding walls 17–20 are reversely bent upon themselves to provide a rounded upper edge which is effectively perimetrally continuous and lies in horizontal plane.

The roof support members 11 and 12 are similar to each other except that they are reversed when mounted on the tray member as will be hereinafter apparent. Therefore a detailed description of only one, such as the support member 11, will be given with the understanding that such detailed description applies equally well to the other support member.

Each of the support members, specifically represented by the one indicated generally by the reference numeral 11 and shown at the right of FIGS. 1 and 2, is preferably formed of a length of metal wire or rod. It is bent into an inverted generally U-shaped form to provide a central inverted U-shaped bight portion 21 from the opposite sides of which two straight inclined shoulder portions 22 and 23 extend downwardly and outwardly and lie generally in the transverse plane of the bight portion 21. The outer or lower ends of the shoulder portions 22 and 23 are integrally connected to more sharply downwardly and outwardly inclined leg or post portions 24 and 25, respectively. At the lower end of each of the leg or post portions 24 and 25, the wire support member is bent to provide a foot portion 26 which extends generally perpendicularly to the plane in which the wire portions 21–25 lie. Each foot portion 26 is shown as having a laterally outwardly turned hook-shaped toe portion including a trunnion part 28 and a termial part 29 which is parallel to its foot portion 26. The trunnion part 28 of each toe portion 28, 29 is shown as being journaled in a hole 30 provided in the adjacent side wall 17 or 18 and at the corresponding end thereof. The holes 30 at the corresponding ends of the side walls 17 and 18 have their axes arranged horizontally and substantially in transverse alinement with each other. The holes 30a at the opposite end of the tray member 10 are similarly arranged to receive the two toe portions of the roof support member 12 arranged at that end of the tray member. The holes 30 and 30a are so spaced from the end walls 19 and 20 that when the support members 11 and 12 are in their operative positions as shown in FIGS. 1, 2, and 6, the various leg or post portions of these members rise from the adjacent corners of the tray member 10.

The roof member 13 may be formed of any suitable material and shaped as desired. As shown, the roof member 13 is fabricated of a single piece of sheet metal of elongated rectangular outline having an area in plan somewhat greater than that for the floor portion 15 of the tray member 10 so that the roof overhangs both the sides and ends of the tray member. The marginal portion of the roof member 13 is preferably reversely bent upon itself to provide a rounded perimetral edge. The room member 13 is shown as bent along a central longitudinal line to provide a ridge 31 from which a pair of flat roof panels 32 and 33 incline downwardly and laterally outwardly. The included angle between the roof panels 32 and 33 is the same as that for the inclined shoulder portions 22 and 23 of the support members 11 and 12. Thus, the roof panels 32 and 33 are adapted to rest upon and engage the inclined shoulder portions 22 and 23 throughout the full length of the latter as best shown in FIG. 3.

Adjacent opposite ends of the ridge 31, the roof member 13 is shown as provided with a pair of transversely elongated openings or slots 34. These openings 34 are severally adapted to receive withdrawably the bight portions 21 of the roof support members 11 and 12, as best shown in FIG. 4. The openings 34 preferably are only slightly longer in a transverse direction than the outside width of the bight portion 21.

The suspension device 14 is provided for hanging the bird feeder from overhead and also for locking the roof member 13 to the support members 11 and 12. While the suspension device 14 may be variously constructed, the same is shown as comprising a length of chain having a hook element 35 at each end thereof. These hook elements 35 are severally adapted to be connected detachably to the eye or apertured lug provided jointly by the bight portions 21 and the roof member 13. When the hook and eye connection is so established, the hook elements 35 prevent withdrawal of the bight portions 21 from the roof slots 34 and the roof member 13 is thus locked on its supports.

Intermediate its ends and centrally thereof, the suspension chain 14 is shown as provided with a hanger hook 36 which enables the bird feeder to be hung from some suitable support (not shown).

The bird feeder in its assembled, operative condition is shown in FIG. 1. Examining FIGS. 1 and 2, it will be seen that the foot portions 26 of the roof support members 11 and 12 engage the upper surface of the floor portion 15 of the tray member and that the two foot portions 26 for the member 11 oppose or face the similar foot portions for the other member 12. Referring particularly to FIG. 2, it is to be observed that the leg or post portions 24 and 25 are inclined to the vertical slightly, being arranged in a plane outwardly of a truly vertical position represented by broken lines at 11a. This is achieved by spacing the openings 34, 34 in the roof member 13 apart a distance slightly greater than the distance between the junctures of the leg and foot portions of the two support members 11 and 12. In other words, when the bight portions 21 are inserted through the roof openings 34, the support members 11 and 12 are flexed or bowed outwardly slightly to the full line position shown in FIG. 2. This tends to assure that the foot portions 26 remain pressed against and thereby in constant engagement with the upper surface of the floor portion 15 of the tray member 10. With these foot portions 26 so engaging the floor portion 15 and with the bight portions 21 extending through the openings 34 in the rigid roof member 13, a relatively rigid assembled structure results. This structure is in the nature of a parallelogram which cannot collapse in either longitudinal direction since the foot portions 26 of the member 11 prevent rightward shift of the roof member 13, as viewed in FIG. 1, and the similar foot portions of the member 12 prevent leftward shift of the roof member.

However, when it is desired to collapse or knock down the bird feeder, the suspension device 14 is first removed by detaching the hook elements 35 from the bight portions 21. Thereafter the roof member 13 is lifted off the support members 11 and 12. These members 11 and 12 may then be folded toward each other and downwardly into an inoperative position in which the leg portions 24 extend generally parallel to the floor portion 15, as depicted in FIG. 5. The free ends of the support members 11 and 12 will overlap somewhat as illustrated. However, the geometry of the support members 11 and 12 and their mounting on the tray member 10 are such that when in their folded inoperative positions, shown in FIG. 5, these members will remain entirely within the confines of the tray member 10. The support members 11 and 12 are pivotally mounted on the tray member 10 initially by having the toe end parts 29 coaxial with their trunnion parts 28 as shown by broken lines at 29a in FIG. 6, inserting them in the corresponding holes 30 or 30a from the inside to the outside of the tray member, and thereafter bending the end parts 29 to be parallel to the corresponding foot portions 26 and arranged exteriorly of the tray member.

The bird feeder may be shipped in compact knocked down condition with the roof support members 11, 12 in the folded condition shown in FIG. 5. The relatively shallow tray member 10 may also serve as a container for the detached suspension device 14, and the roof member 13 may be arranged in juxtaposition to the tray member. For example, the components in this knocked down condition might be suitably packed in a cardboard carton (not shown) for purposes of shipment.

It is apparent that when assembling the bird feeder, the roof support members 11 and 12 are first unfolded from their inoperative position shown in FIG. 5 to the upright operative position shown in FIG. 1, following which the bight portions 21 are inserted through the roof openings 34 and locked in such position by connection of the hook elements 35 of the suspension device 14. In such assembling operation, no tools are required and the bird feeder can be placed in its operative condition in a very short interval of time.

From the foregoing, it will be seen that the embodiment of the present invention illustrated and described accomplishes the various stated objects. Inasmuch as changes in construction might occur to those skilled in the art, the embodiment disclosed is intended as illustrative and not limitative of the present invention the scope of which is to be measured by the appended claims.

What is claimed is:

1. In a bird feeder, the combination comprising a tray member including a floor portion, a roof member, a pair of support members arranged in opposing relation and spaced from each other, means pivotally mounting said support members on said tray member for pivotal movement about respective axes severally extending transversely of the direction of spacing between said support members, each of said support members including a foot portion normally positioned relative to such pivotal means in releasable contact with said floor portion, said support members being movable from a generally upright operative roof supporting position in which said foot portion engages said floor portion to an inoperative position, in which said foot and floor portions are disengaged, and means for detachably connecting said support members, when in their aforesaid operative positions, to portions of said roof portion which are spaced apart thereby to hold said foot portions in pressure contact with said floor portion.

2. In a knockdown bird feeder, the combination comprising a tray member including a floor portion, a roof member, a pair of support members arranged in opposing relation and spaced from each other, means pivotally mounting said support members on said tray member for pivotal movement about respective axes severally extending transversely of the direction of spacing between said support members, said axes being substantially parallel, each of said support members including a leg portion and a foot portion normally positioned relative to such pivotal means in releasable contact with said floor portion, said support members being movable from an unfolded operative roof supporting position in which said foot portion engages said floor portion and said leg portion extends uprightly from said floor portion to a folded inoperative position in which said leg portion extends generally parallel to said floor portion, said foot portion of each of said support members extending laterally from its said leg portion in said direction, said support members being foldable toward each other when severally moving toward their aforesaid folded inoperative positions, and means for detachably connecting said support members, when in their aforesaid unfolded operative positions, to portions of said roof portion which are spaced apart thereby to hold said foot portions in pressure contact with said floor portion.

3. In a bird feeder, the combination comprising a tray member including a floor portion, a roof member, support members arranged to support said roof member in an elevated position thereabove, each of said support members including a pair of spaced leg portions and a pair of spaced foot portions, means pivotally mounting said foot portions of each of said support members on said tray member so that said foot portions are normally positioned relative to such pivotal means to be in releasable contact with said floor portion whereby said foot portions engage said floor portion when the corresponding support member is in an operative roof supporting position, and means for detachably connecting said leg portions to portions of said roof portion which are spaced apart thereby to hold said foot portions in pressure contact with said floor portion.

4. In a knockdown bird feeder, the combination comprising a tray member including a floor portion and an upstanding side wall portion provided with transversely alined holes at opposite ends thereof, a roof member including flat panels inclined to each other to provide a ridge and having an opening adjacent opposite ends thereof, a pair of upright transverse support members arranged to support said roof member in an elevated position above said tray member, each of said support members comprising a single length of wire bent to provide a central inverted U-shaped bight portion from opposite sides of which shoulder portions incline downwardly and laterally, leg portions extending downwardly severally from the outer ends of said shoulder portions, each leg portion at its lower end having a foot portion from which a toe element extends laterally outwardly, said toe elements being journaled in said holes to provide a pivotal mounting, said foot portions being normally positioned relative to said pivotal mounting in releasable contact with said floor portion, each of said support members being movable from a folded inoperative position in which said leg portions extend generally parallel to said floor portion to an unfolded operative roof supporting position in which said foot portions engage said floor portion and said leg portions extend uprightly from said floor portion, said roof panels resting on said shoulder portions of said support members when in said operative positions with the said bight portions withdrawably projecting severally through said openings, said openings being spaced from each other a distance thereby to hold said foot portions in pressure contact with said floor portion, and suspension means having a hook element at opposite ends severally detachably connected to said bight portions, when so connected said hook elements preventing withdrawal of said bight portions from said openings.

References Cited in the file of this patent

UNITED STATES PATENTS

| | | |
|---|---|---|
| 1,954,286 | Dercum | Apr. 10, 1934 |
| 2,184,633 | Copeman | Dec. 26, 1939 |
| 2,316,463 | Skulina | Apr. 13, 1943 |
| 2,634,705 | Mayes | Apr. 14, 1953 |
| 2,789,536 | Hawkins | Apr. 23, 1957 |

FOREIGN PATENTS

| | | |
|---|---|---|
| 229,325 | Australia | July 5, 1960 |